United States Patent [19]

Chess et al.

[11] Patent Number: 5,485,575
[45] Date of Patent: Jan. 16, 1996

[54] AUTOMATIC ANALYSIS OF A COMPUTER VIRUS STRUCTURE AND MEANS OF ATTACHMENT TO ITS HOSTS

[75] Inventors: David M. Chess, Mohegan Lake; Jeffrey O. Kephart, Yorktown Heights; Gregory B. Sorkin, New York, all of N.Y.

[73] Assignee: International Business Machines Corporation, Armonk, N.Y.

[21] Appl. No.: 342,949

[22] Filed: Nov. 21, 1994

[51] Int. Cl.[6] .................................................. G06F 11/34
[52] U.S. Cl. ............................................ 395/183.14; 380/4
[58] Field of Search .............................. 395/575; 371/19; 380/4, 25

[56] References Cited

U.S. PATENT DOCUMENTS 5,349,655  9/1994  Mann ...................................... 395/575
5,359,659  10/1994  Rosenthal .................................... 380/4

OTHER PUBLICATIONS

Chess, David, "Virus Verification and Removal—Tools and Techniques", Virus Bulletin, dtd Nov. 1991, pp. 1–7.

*Primary Examiner*—Robert W. Beausoliel, Jr.
*Assistant Examiner*—Phung My Chung
*Attorney, Agent, or Firm*—Whitham, Curtis, Whitham & McGinn; Robert Tassinari

[57] ABSTRACT

Information pertaining to the verification of the identity of, and reversal of, a transformation of computer data is derived automatically based on a set of samples. The most important class of transformations is computer viruses. The process extracts this information for a large, fairly general class of viruses. Samples consisting of host programs infected with the virus and sample pairs consisting of an infected host and the corresponding original, uninfected host are obtained. A description of how the virus attaches to the host program, including locations within uninfected host of components of both the original host and the virus is generated. Viral code is matched across samples to obtain a description of "invariant" regions of the virus. Host bytes embedded within the virus are located. A description of the original host locations permits ant-virus software on a user's machine to restore the bulk of a program that has been infected. Characterization of the correspondence between invariable portions of the virus and destroyed parts of the host enables anti-virus software to complete the repair.

23 Claims, 5 Drawing Sheets

Virus Section as Variable/Constant Subsections

AUTOMATIC ANALYSIS OF A COMPUTER VIRUS STRUCTURE AND MEANS OF ATTACHMENT TO ITS HOSTS

CROSS-REFERENCE TO RELATED APPLICATION

This application is related in subject matter to application Ser. No. 08/342,519, filed concurrently herewith by William C. Arnold, David M. Chess, Gregory B. Sorkin, Steve R. White and Jeffrey O. Kephart for "Searching for Patterns in Encrypted Data", allowed Apr. 3, 1995 and assigned to a common assignee, the disclosure of which is incorporated herein by reference.

BACKGROUND OF THE INVENTION

1. Field of the Invention

The present invention generally relates to automatic analysis of computer viruses for the purpose of extracting from them information that is necessary for their detection and eradication and, more particularly, to a method of automatically deriving a virus' means for attaching to a host.

2. Description of the Prior Art

Whenever a new computer virus is discovered somewhere in the world, anti-virus software that checks for known viruses must be updated so as to detect the presence of the virus in infected programs and, possibly, to restore such programs to their original uninfected state. Traditionally, the only way to obtain information that permits detection and removal of the virus has been for human experts to analyze the viral code in minute detail, a procedure that is difficult and time-consuming.

The following description of how viruses typically infect host programs helps to explain what sort of information must be obtained in order to detect and remove computer viruses. Unlike biological viruses, which typically destroy their host cells, computer viruses have a vested interest in preserving the function of their host programs. Any computer virus that causes its host to malfunction would be likely to arouse a user's suspicion and thus bring about its own untimely demise. By far the easiest way for a virus author to ensure this, and the only way used in practice, is to keep the original code intact and add the virus code to it. More specifically, it is almost universal to have the virus code execute first, then pass control back to the victim program. (Because the victim code might terminate in a variety of places under a variety of conditions, it is more difficult to design a virus that runs after the victim, and we know of no cases where this has been done.) For this reason, an infected program usually contains the entire contents of the original file in some form. Almost universally, the infected program contains large contiguous blocks of code from the original host (perhaps with some rearrangement of the original order), interspersed with blocks of virus code. Some pieces of the original host may not appear explicitly but, instead, be encrypted and stored in data regions of the virus. Another important observation is that almost all viruses intersperse host and virus code very consistently, independent of the host, the operating environment, the virus' generation, etc.

Given these characteristics of typical viral infections, it is apparent that, in order to repair an infected program, one simply needs to know the locations of the pieces of the original host and how they ought to be joined to form the original. Additionally, in cases where portions of the host are imbedded, encrypted, in the virus, it is necessary to know where the imbedded bytes are, how they must be decrypted, and where in the reconstructed host they must be placed.

In order to recognize the presence of a particular virus in a program, one needs to know the locations of the one or more sections of viral code in the infected program, and what each section looks like. Describing the appearance of a viral section is more complicated than might first be supposed. For a variety of reasons, there are often regions within a virus that vary from one instance to another. Data regions are particularly volatile, as they may contain information specific to the particular time at which or environment in which they are created. A reasonable approach is to simply ignore such regions, and base recognition solely on invariant regions of the virus.

Another common source of variation is self-garbling; i.e., light-weight encryption techniques intended to avoid detection by virus scanners which use simple pattern matching. In this scheme, a large proportion of the virus is stored encrypted, its appearance governed by a variable key stored in a data region of the virus. The virus applies the appropriate decryption to its encrypted regions before those region are themselves executed. The fact that the virus is able to transform this "variable" region back into an executable, presumably invariant form, means that an invariant form exists, and can potentially be used to recognize that region of the virus. An "invariant" viral region can be described in terms of an invariant byte string, and the decryption procedure and key location—or key independent invariant function—that produces it from the original, encrypted region.

In brief, a virus can be described with accuracy sufficient to permit its detection and removal by characterizing 1. how it attaches itself to host programs,
2. the form and location of its "invariant" regions, and
3. the location and decryption of host bytes imbedded in the virus. Heretofore, the only method for obtaining such an intimate knowledge of the nature of the virus has been manual, tedious labor by a human expert, who examines the virus' machine code and perhaps looks at one or more samples of it, and then manually records the required information in a form suitable for use by anti-virus software. Anti-virus researchers and developers are finding themselves just barely able to keep up with the influx of several new computer viruses that are written every day by virus authors working around the clock and around the world. An automated method for characterizing viruses as described above is currently very desirable. Given that virus writers are starting to automate the process of creating new viruses, it may soon become absolutely essential.

SUMMARY OF THE INVENTION

It is therefore an object of the present invention to provide a method of generating a characterization of a given virus that is sufficiently detailed to permit anti-virus software to detect and if possible remove the virus.

The invention extracts this information automatically for a large, fairly general class of viruses. The method according to the invention includes:

1. obtaining a set of "sample pairs", each sample pair consisting of a program infected with the virus and the corresponding original, uninfected program;
2. generating a description of how the virus attaches to host programs;

3. matching viral code across different samples to obtain a description of "invariant" regions of the virus; and 4. locating within the other, variable regions of the virus any host bytes that may have been embedded there, perhaps after encryption.

More specifically, item (2), the virus attachment description produced by this invention, gives the location(s) of components of both the original host and the virus in an infected host program. A concise description of the original host locations permits anti-virus software on a user's machine to restore the bulk of a program that has been infected with the virus to its original, uninfected state. The description of the location of the virus in the infected program allows procedure (3), determination of the form and location of the "invariant" regions, to be performed. This information allows anti-virus software to make a fairly exact identification of the virus in a given program. Complete characterization of the invariant portions of the virus permits the final step, procedure (4), examination of the variable portions of the virus to determine whether they contain (possibly in encrypted form) any bytes from the host that are absent from the attachment description. This information enables anti-virus software to complete the repair of an infected program.

In one embodiment of the invention, the automatic virus analysis is conducted on a set of one or more different viruses, and the results incorporated manually or automatically into databases used by anti-virus software. The databases are distributed with new releases of the software.

In another embodiment of the invention, the automatic virus analysis procedure itself is incorporated into anti-virus software that runs on individual computers or networks, and the local anti-virus databases are updated automatically when a new virus is encountered and analyzed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
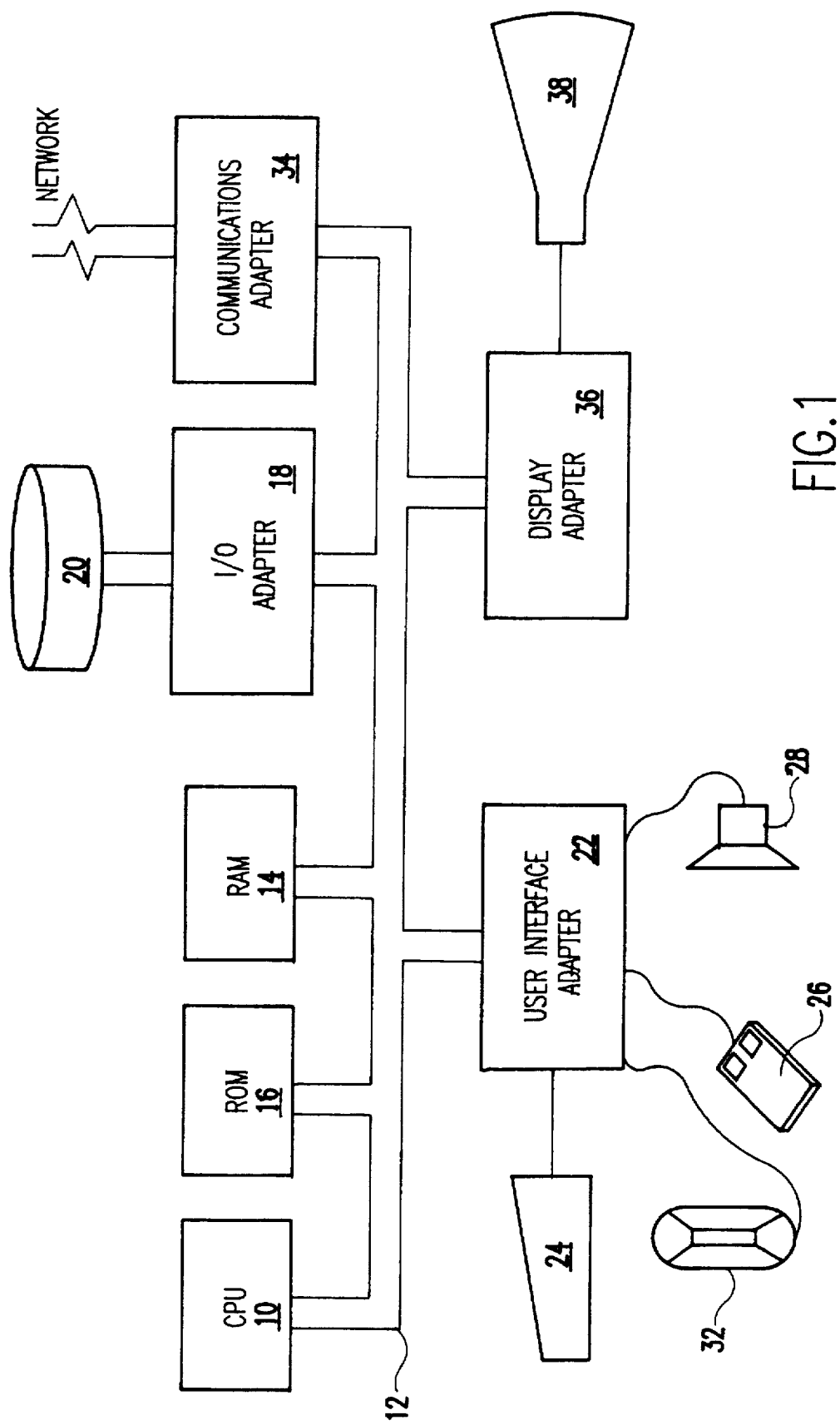
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer, such as the International Business Machines (IBM) Corporation's PS/2 series of personal computers, or a work station, such as IBM's RS/6000 Workstations. These are but representative examples, and it will be understood by those skilled in the data processing arts that the invention is not limited to these computers and may be advantageously practiced on other and different computers including mini and mainframe computers.

For the specific example of a personal computer, the hardware includes a central processing unit (CPU) 10, which may be, for example, a microprocessor supporting the X86 architecture of Intel Corporation, or a reduced instruction set computer (RISC) microprocessor such as IBM's PowerPC microprocessor. The CPU 10 is attached to a system bus 12 to which are attached a read/write or random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. The user interface adapter 22 has attached to it a keyboard 24, a mouse 26, a speaker 28, a microphone 32, and/or other user interface devices (not shown). The personal computer also includes a display 38, here represented as a cathode ray tube (CRT) display but which may be a liquid crystal display (LCD) or other equivalent display. The display 38 is connected to the system bus 12 via a display adapter 34. Optionally, a communications adapter 34 is connected to the bus 12 and to a network, such as a local area network (LAN), such as IBM's Token Ring LAN. Alternatively, the communications adapter may be a modem connecting the personal computer to a telephone line as part of a wide area network (WAN).

Figure 2:
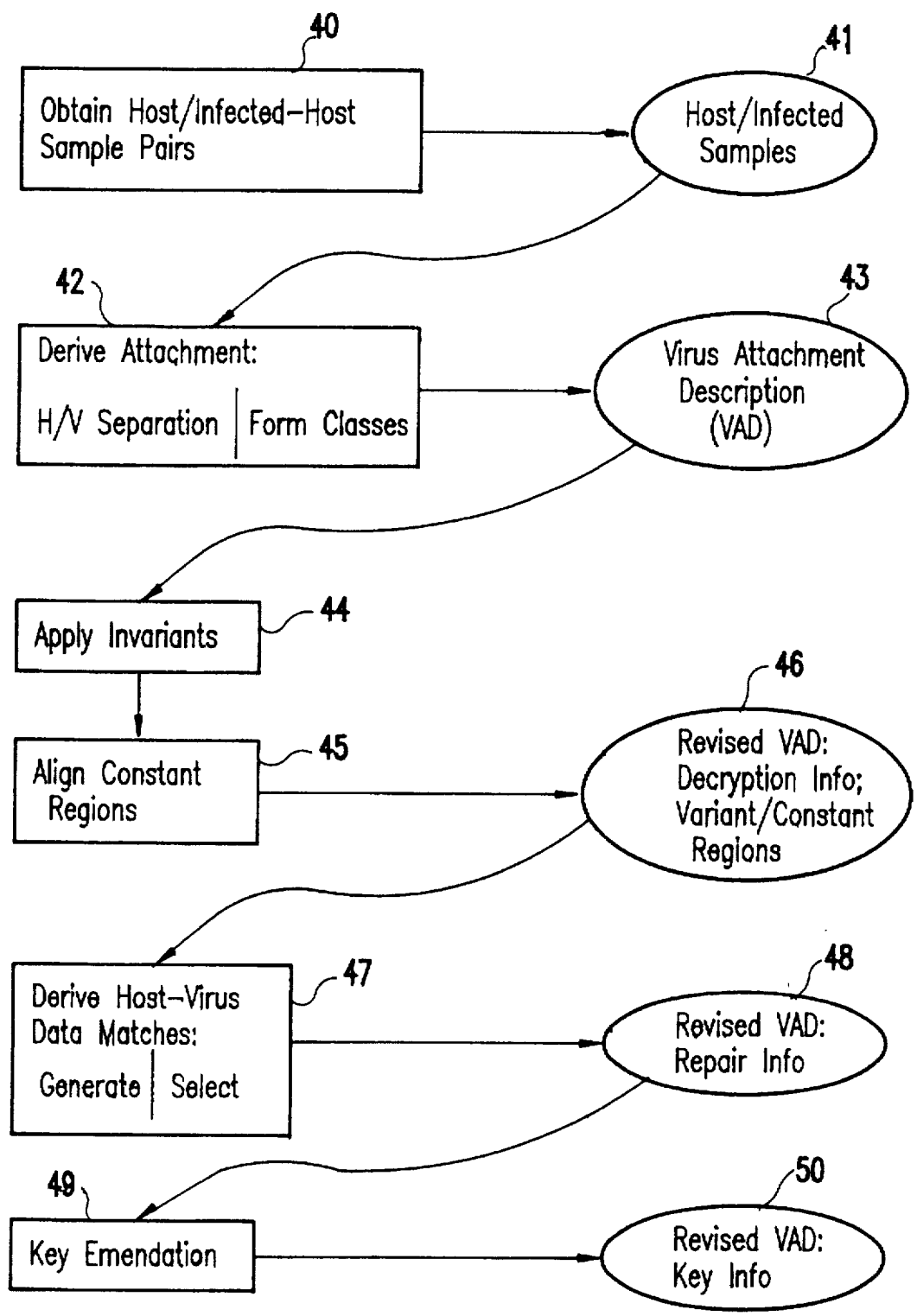
FIG. 2 is a flowchart showing the logic of automatic analysis of a computer virus' structure according to the invention.

The preferred embodiment of the invention may be implemented on the personal computer shown in FIG. 1, which is but a representative example of the hardware on which the invention may be implemented. The process according to the invention will now be described by way of a specific example shown in FIG. 2. More particularly, FIG. 2 shows a flowchart of the method according to the invention. The process involves first obtaining (host, infected-host) sample pairs in function block 40. The (host, infected-host) samples output 41 is input to function block 42 where the description of how the virus attaches to host programs is generated. The virus attachment description (VAD) output 43 is input to function block 44 where invariants are applied. This is followed by function block 45 where constant regions are aligned. The output 46 is a revised VAD including decryption information and identification of variable and invariant regions. The revised VAD is input to function block 47 where the host-virus data matches are derived. The output 48 is a revised VAD that includes a description of regions of the virus matching original host information. This is input to function block 49 where key emendation is performed. The final output 50 is a revised VAD with accurate encryption key information.

With this brief overview of the invention, a fuller description is now given of 1. means of obtaining pairs of original, uninfected host files and the same programs after viral infection, i.e., (host, infected-host) pairs;

2. a specification of the virus-attachment description, and means of deriving it from samples of infected and uninfected programs;

3. a specification of the virus-structure description, and means of deriving it from the virus attachment description and infected samples; and 4. a specification of the host-byte corruption description, and means of deriving it from the virus-attachment description, the virus-structure description, and samples of infected and uninfected programs.

Obtaining (host, infected-host) Sample Pairs

Ideally, a virus description should apply universally to all host programs susceptible to the virus, but determining with certainty that this is the case is extremely difficult. It is closely related to the "Halting Problem", C. H. Papadimritiou, Computational Complexity Addison Wesley, 1994, Reading, Mass. This canonical problem in the theory of computer science, determining whether a given computer program will terminate, has been proved to be "undecidable"; that is, there is, provably, no formal procedure, no computer program, that can always answer the question correctly.

Instead, our paradigm is to infer a virus' behavior from a finite set of infected files and their original, uninfected versions. See Table 1.

TABLE 1

PAIRING OF KNOWN, UNINFECTED HOST FILES AND THEIR CORRESPONDING VIRUS-INFECTED FORMS

| uninfected host 1 | infected host 1 |
|---|---|
| uninfected host 2 | infected host 2 |
| . | . |
| . | . |
| . | . |
| uninfected host N | infected host N |

Fortunately, typical viruses do not possess an extensive repertoire of behaviors, and experience has shown that an analysis based on a few (host, infected-host) pairs is likely to be correct universally. The method we have used in practice is to create (host, infected-host) pairs by deliberately provoking a virus to attack a library of standard "goat" programs. Since the attractiveness of a potential victim depends on its static and dynamic attributes, the goats should be chosen to cover a range of file types, sizes, etc., and should be exercised, i.e. run, created, modified, etc., as energetically as possible. The goats should also be as widely varied as possible in order to show up as much as possible of the virus' range of behaviors; in particular, variation in the header information (and by implication in what the header describes, such as the size) is important; long regions of "0s" or other repeated bytes are also relevant to some virus' attacks.

Another method, particularly applicable to network environments, is to look for a clean copy of an infected program elsewhere on the same machine or network. (Various means, notably verification of a file's checksum, can be used to validate the file as a true copy of the original.) Then the program that is suspect (perhaps because its checksum has changed or other generic virus detection heuristics are triggered), and another copy that is trusted, can serve as a (host, infected-host) pair.

A related method is to use a backup copy of the program as the "uninfected" reference; of course this requires that clean backups exist, and probably requires human assistance to access them.

Even without knowing much about the particular virus infecting a host program, it is often possible to repair the host, especially if some redundant information (such as a header and various checksums) has been saved beforehand. Some existing anti-virus programs have such generic disinfection procedures. If an infected program can be disinfected by the generic means, the product can be used as the reference "uninfected host". (In case it seems silly to use a generic disinfection repair procedure to derive a customized procedure for a particular virus, it is not: the customized procedure can be used to scan other programs for evidence of infection, can verify the identity of the infecting virus, can allow repairs with increased speed and confidence, and, especially important, can be used to prevent a virus from attacking in the first place, and potentially causing unknown harm by destroying irreplaceable data or disrupting operations.)

Certain information, in particular the virus attachment pattern, might also be derived without recourse to uninfected hosts. In particular, variations on the methods described could be used to compare viral sections across all infected samples, rather than comparing host sections across one (host, infected-host) pair. (This could also be done in a manner resistant to viral encryption.) This is most likely to work for viruses which attach rather simply, and can always be augmented by trial-and-error reconstructions of the hosts until they satisfy some criterion, such as running properly.

Virus Attachment

Once the (host, infected-host) samples have been obtained at output 41, the virus attachment pattern is derived in function block 42. Among viruses that run in DOS (disk operating system) systems, "appending" is the most common method of attachment. An "appending" virus attaches itself to the end of the host, and modifies the beginning of the host so as to cause execution to begin within the viral code, rather than the host code. The viral code is customized such that, when it terminates, it branches back to the point at which the original host was supposed to begin execution (the original "entry point").

There are two variants of the "appending" method, along with a couple of other fairly common methods. In the append with branch method, the virus attaches itself to the end of the host, modifying the beginning of the host, so that execution goes immediately to the virus, which eventually passes control back to the host. The modification to the beginning of the host is performed in a very simple, obvious manner, such that the location of the virus can be determined trivially from a known, fixed set of bytes in the modified area. A "buffer" of meaningless data may also be placed between host and virus (usually for the purpose of ensuring that the virus code begins at some multiple of 8 or 16 bytes from the beginning of the executable file). The virus attachment description for an appending virus can thus be parameterized by:

1. the offset of the virus' start from the (trivially determined) nominal entry point,
2. the length of the virus, and
3. the maximum size of the buffer.

The append without branch method is similar to the above, but the branch is difficult to determine statically (i.e., without actually simulating the code). The relevant parameters are 1. the length of the virus, and
2. the maximum size of the buffer.

In addition to the foregoing, in the pre-append method, the virus does not modify any portion of its victim. Instead, it places some of its code before the victim, and (sometimes) more code or data after the victim. The relevant parameters are 1. the length of the pre-pended viral section, 2. the length of the appended viral section, and 3. the maximum size of the buffer.

Figure 3:
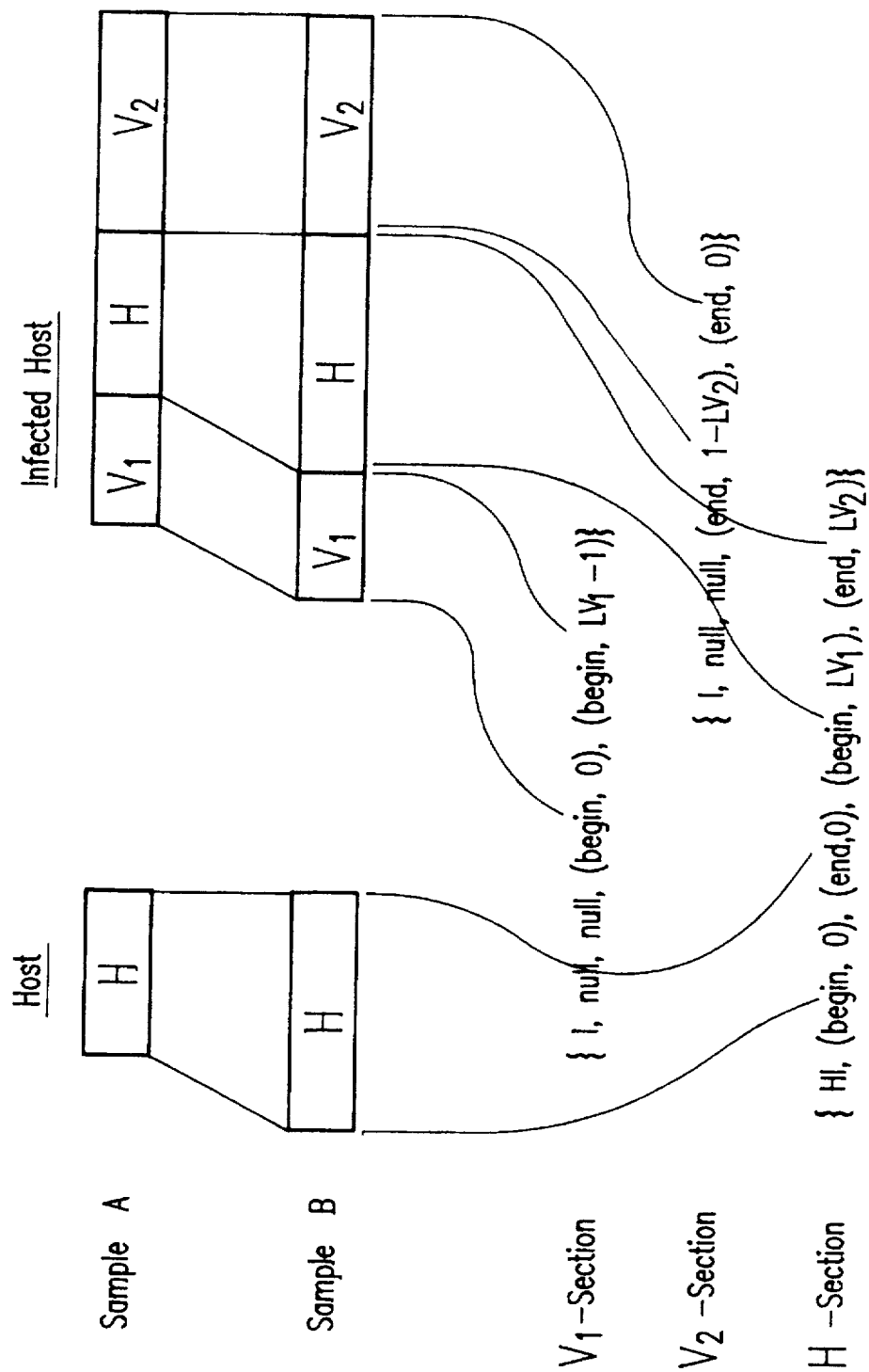
FIG. 3 is a diagram of a typical infection pattern illustrating the manner in which a virus alters a host's files.

FIG. 3 illustrates the pre/append viral attachment. In the first row, "Sample A", there is a representation of a host file, labeled "H", and the same file after viral infection. The prepended viral portion is labeled "$V_1$", and the appended portion is labeled "$V_2$".

In the demise-type method, a length-n virus writes itself over the first n bytes of the host, having first copied these bytes to the end of the host (with a buffer in between). If the victim was shorter than the virus, the virus merely copies the victim to the end of the virus (with the buffer in between). The relevant parameters are 1. the length of the virus, and 2. the maximum size of the buffer.

Although the preponderance of viruses fall into these four categories, it is useful to introduce a more general parameterization of virus attachment, one that encompasses the special cases described above, and much more. In the case of practically every viable virus that has been observed, the infected host file consists of sections of contiguous bytes taken verbatim from the original host file, interspersed with sections of virus code or data (for this purpose the distinction is unimportant). For most viruses, any infected host has a small, fixed number of sections. The host-derived sections occur in a fixed order (not necessarily their order in the original host), and they come from places within the host that are also fixed, in an appropriate reference frame.

Actually, this glosses over one rather inconvenient detail, which is that many viruses attack different classes of hosts differently. Specifically, different attachment patterns are usual for DOS COM- and EXE-format files (i.e., these types of executable files), and different attachment patterns sometimes occur for hosts of different lengths. So in general a full attachment description must cover each class separately:

$$\text{FullAttachInfo} = \{<\text{class,AttachInfo}>_c\}, \tag{1}$$

where the notation indicates a set of <class,AttachInfo> vectors, each indexed by a value of c. Classes must be defined by attributes of the infected host, since in eventual application the original host is of course nonexistent; it has been transformed to the infected host. Typical class definitions allowed are $$\text{class} = \left\{ \begin{array}{l} \text{"COM"} \\ \text{"EXE"} \\ <\text{"length", min-length,max-length}> \end{array} \right\}. \tag{2}$$

For any class, the attachment is described in the form $$\text{AttachInfo} = \{<\text{SecType,loc,loc,loc,loc},\text{EncryptionInfo}>_{|i}\}; \tag{3}$$

that is, a collection of sections, indexed by i, and described by a "type", four locations, and possibly EncryptionInfo (Data Format for Encrypted Regions, infra).

These sections are a partition of the original and infected hosts into contiguous regions. There are three types of sections, described by $$\text{SecType} = \left\{ \begin{array}{ll} H: & \text{section appears in original host only;} \\ I: & \text{section appears in infected host only;} \\ HI: & \text{section appears in original and} \\ & \text{infected hosts.} \end{array} \right\} \tag{4}$$

Together, sections of type H and HI cover the entire original host without any overlap, and sections of type I and IH cover the entire infected host without any overlap.

Sections of SecType I are assumed to be virus code, data, or buffers, e.g., meaningless data whose purpose is merely to fill space. Sections of type HI are sections of the original host that remain intact in the infected host; they can be used to at least partially reconstruct the original. Sections of type H are sections of the host that do not appear explicitly in the infected host. They result from viruses that modify the host somewhat. Sections of type H are not necessarily lost. Often, the virus hides such sections, in encrypted form, in its own data regions, and a further processing step can recover them.

Each section of AttachInfo includes four locs, each of the form $$\text{loc} = \left\{ \begin{array}{l} <\text{marker,offset}>, \\ \text{null.} \end{array} \right\} \tag{5}$$

The first two locs describe the section's beginning and end locations in the original host, and the last two describe the locations in the infected host. (If the section does not appear in one or other host, that pair of locs is set to null.) An important requirement is that a loc be independent of the length of the host. This enables the virus attachment description to cover any host infected with the virus, regardless of the host's length.

To achieve this, locations are measured with respect to judiciously chosen markers. Useful markers include the file's beginning, end, and apparent entry point (the recognizable target of a branch instruction near the beginning of the file), and the location of a specified character string within the file. So a marker takes one of the values $$\text{marker} = \left\{ \begin{array}{l} \text{"begin"} \\ \text{"end"} \\ \text{"entry"} \\ <\text{"string",character string}>, \end{array} \right\} \tag{6}$$

where in the last case, extra information consisting of the character string serving as reference point must be provided. Other sorts of markers are conceivable.

Offsets from markers are measured in a suitable unit, generally bytes. As suggested by the notation, each loc may use different markers: different ones may be used for the beginning and end of a section, and for locating the section with respect to the original and infected hosts.

The offset is generally just an integer, but in some stages of the invention it is desirable to allow a range delimited by minimum and maximum offsets, in case the virus' length is slightly variable, or it pads the host with meaningless data when it attaches itself. We allow the offset to contain either a single value or a range:

$$\text{offset} = \left\{ \begin{array}{l} \text{value,or} \\ <\text{min-value,max-value}>. \end{array} \right\} \tag{7}$$

To illustrate, we describe the special "pre/append" attachment method in the general language, as graphically illustrated in FIG. 2. A host infected by a virus of this type has three sections: a viral section $V_1$ of length $L_{V_1}$, followed by the original host H of length $L_H$, followed by a second viral section of length $L_{V_2}$.

$V_1$ is a small fragment of virus code prepended to the victim, as shown in FIG. 3. It is not, of course, part of the original host. It is described by:

$$<I,\text{null,null},<\text{"begin"},0>,<\text{"begin"},L_{V_1}-1>>. \tag{8}$$

H is the original host, which is also a part of the infected host, as shown in FIG. 3 and described by:

$$<HI,<\text{"begin"},0>,<\text{"end"},0>,<\text{"begin"},L_{V_1}>,<\text{"end"},-L_{V_2}>>. \quad (9)$$

$V_2$ is the part of the virus appended to the infected host, as shown in FIG. 3, and like $V_1$ is not part of the original host:

$$<I,\text{null},\text{null},<\text{"end"},1-L_{V_2}>,<\text{"end"},0>. \quad (10)$$

The full description is just the set of the three section descriptions above. Note that the markers have been chosen judiciously, so that the length $L_H$ of the original host, which is variable, does not appear in the virus attachment description. Thus, the description pertains to any host regardless of its length.

The virus attachment description (VAD), or AttachInfo, is fully described at output 43 in FIG. 2. At this point, two general remarks are in order. First, for the four special attachment categories that were set forth initially, or others one might define, attachment could be described in a specialized and succinct form. This however would come at the expense that each category requires its own parameters and interpretation, and it may be simpler to go directly to the general case. Second, although conceived with viruses in mind, attachment descriptions are applicable to other file-transforming operations which preserve the data contained in the original file, possibly rearranging it and interspersing it with additional data. An example of a non-viral transformation of this sort is the addition of checksum or "immunization" information to a program, performed by certain anti-virus software. The addition of such information to the program can be more harmful than it is helpful, and it may be desirable to return the program to its original state by stripping away the extraneous data. The invention is framed in temps of virus attachment, but it is equally applicable to the more general class of transformations.

Given a collection of (host, infected-host) pairs, inferring virus attachment patterns for viruses in pre-defined special categories is largely a matter of template matching. For an "append without branch", for instance, we first verify that, over the length of each original file, the original matches its infected equivalent (with allowable exceptions for the first few bytes). Then, if the infected file is always exactly n bytes longer than the host, these last n bytes constitute the virus. If the length increase varies by a few bytes, this is usually due to a buffer appended to the host to pad it out to a multiple of 8 or 16 bytes.

Other specialized attachment methods are determined similarly. Derivation of a general virus attachment description is a more complex procedure which may be broken into two separate steps.

First, for each (host, infected-host) pair, locate sections of original host code in the infected file. All remaining parts of the infected file are assumed to be vital. Results of this process are close to the required AttachInfo parameterization. The effective difference is that the classes so far are individual (host, infected-host) sample pairs, and the markers, arbitrarily chosen, do not give offsets that are constant over broader classes. Next, the samples are grouped into classes which have matching SecTypes, and whose markers can be chosen to produce offsets which are constant (or nearly so) over all samples in the class.

These steps are now described in greater detail. For each (host, infected-host) pair:

1. Identify sections that are common to the original host (H) and the infected host (I). A preferred implementation, which has been used in practice, employs a "greedy" algorithm. (Alternative algorithms could be employed to maximize the total size of the matching regions, or to maximize a cost function favoring a large total size and a small number of regions.) More particularly, in the greedy common-text extraction algorithm, first, identify the longest contiguous sequence of bytes that is common to both H and I. This section, of type HI, is removed from further consideration in both H and I. Identify the longest contiguous sequence of bytes that is common to the remaining portions of both H and I. Repeat until the sequence found is shorter than some threshold. This procedure produces all of the sections of type III.

2. Consider bytes in H that were not included in the HI sections. The contiguous regions of such bytes, delineated by the boundaries of HI-type sections in H, constitute the sections of type H.

3. Consider bytes in I that were not included in the HI sections. The contiguous regions of such bytes, delineated by the boundaries of HI-type sections in I, constitute the sections of type I. For each sample pair, and each section regardless of its type, record "raw" section location information in a restricted version of the AttachInfo format: First, since this gives AttachInfo information for every sample individually, every sample must be considered to be in a separate class. (And for this purpose we allow class to identify a sample.) Related to this, the choice of a location's marker to minimize the variation of the corresponding offset over the class is so far meaningless (the classes are of size 1), so we arbitrarily set all the markers to "begin", and measure the offsets accordingly.

Now attempt to merge the virus attachment patterns into one or more classes, and select markers to minimize the range of offsets over all samples in each class. This can be accomplished in two broad stages.

First, for each (host, infected-host) pair, sort all the sections of types I and HI according to the offset of the section's beginning in the infected file (the third loc in AttachInfo). To this list append the sections of type H, sorted according to the offset of the section's beginning in the host (the first loc in AttachInfo). Discarding sections of less than some threshold length can avoid spurious sections arising from coincidentally matching bytes in the original and infected hosts. This produces an ordered list of sections for each sample pair.

All sample pairs which share the same host/virus "attachment pattern", i.e., the same ordered pattern of H, I and HI section types, compose a tentative class. This is implemented by creating a new class, containing a list of these samples and empty AttachInfo.

Next, choose markers for each class. Within a tentative class, there is an obvious correspondence of AttachInfo sections across samples; i.e., those occurring in the same position in the ordering defined above. Making this correspondence, for any section and any of its four locations, a choice of marker defines new relative offsets for all the samples (those giving the same absolute locations as the old "begin" marker and the offset from it). For each section and location, what is desired is a marker which minimizes the cross-sample variations in the corresponding offsets.

Over the basic marker types "begin", "end", and "entry", the best can be chosen by trial and error. Use of "string" markers requires identifying the reference string, too, and demands pattern-matching techniques.

If two markers are equally good according to the minimal-variation criterion, ties can be broken by any reasonable means, such as preferring marker types for which the locations are the easier to compute.

Once markers have been chosen for every section, AttachInfo for the class can be filled in. Basically, it is a copy of the AttachInfo for any of its constituent samples. These agree in all SecTypes and markers. Where the offsets also agree, they too may be copied directly. Where they vary slightly, the class' offset can be defined by the minimum and maximum of the sample offsets. For slightly greater generality, the range could be broadened, based on the fact that, for example, some viruses pad sections of the host to a multiple of 8 or 16 bytes.

If the range of offsets exceeds some threshold, an effort can be made to reduce it by splitting the class into two or more new classes, each with smaller variation.

Repeat for all classes, including those formed by splitting previous classes.

Complete the class descriptions. The classes formed so far are simply those which enable the sample AttachInfo descriptors to be combined as much as possible. To be useful ultimately, though, it must be determinable what class an infected file fails into. Thus, the classes must be correlated with readily ascertained attributes of their infected samples, such as their file type or file length.

This results in the collection of all of the information required for the virus attachment description that was set forth above.

A key point is that the specialized and generalized virus attachment descriptions, and the procedures for deriving them, do not involve the content of the "viral" regions at all. This can make it easier to analyze self-encrypting viruses and other "polymorphic" viruses whose appearance changes from one infection to the next. That is because same sections of different samples have already been put into correspondence without reference to their content, and further procedures can be applied to relate the content of samples encrypted with different keys.

Comparing Virus Sections to Identify Invariant Regions

Figure 4:
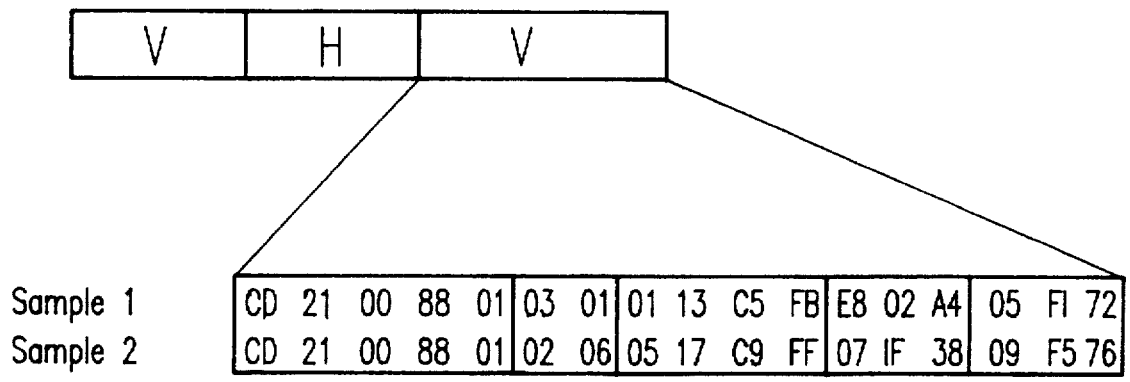
FIG. 4 is a diagram showing invariant and variable regions of a viral section.
Figure 4:
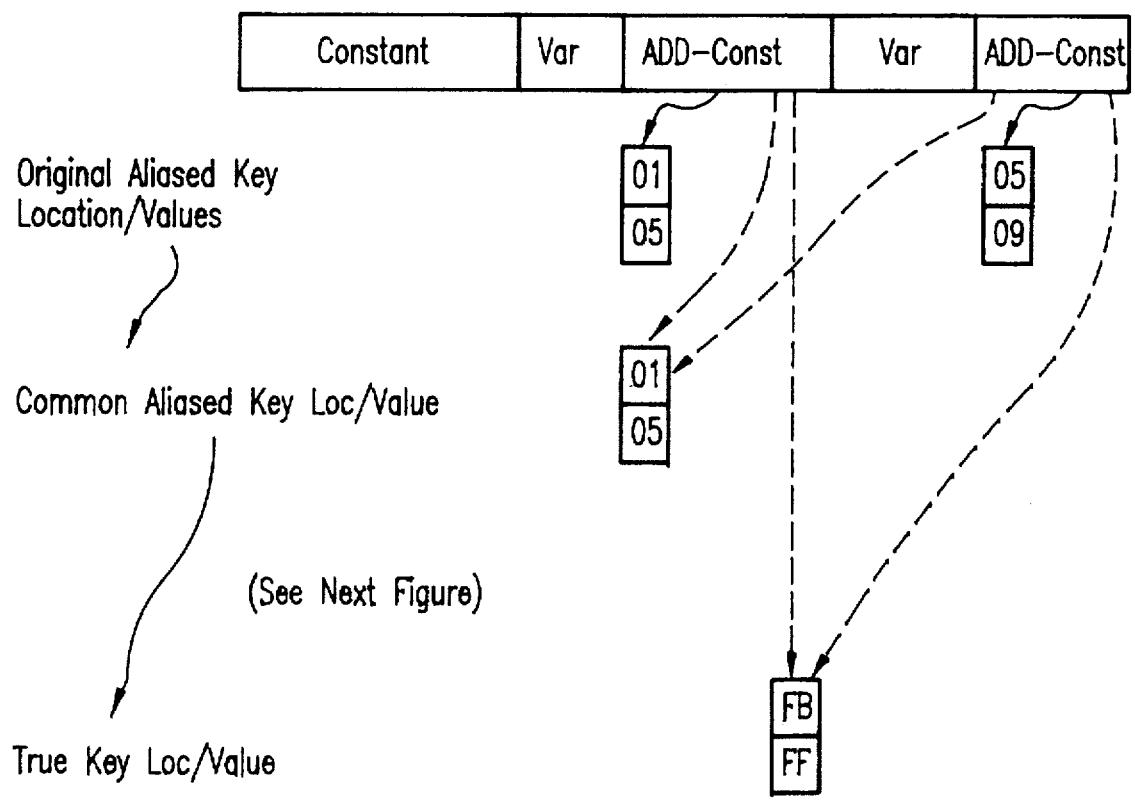

The next step in the procedure shown in FIG. 2, is comparing virus sections to identify invariant regions in function block 44. This procedure is illustrated in FIG. 4. In contrast to the process of deriving attachment, which looks only at sections' types and locations, this set of procedures compares the content of the sections. It looks only at viral sections (sections of SecType I), and has two purposes:

1. To split the given sections into finer sections whose data is constant across samples, and others that vary across samples.
2. Where possible, to reduce a section location's offset variations to 0.

The first process is important because sections that are constant across samples are presumed to contain virus code, or virus data that seems not to be changing. In its entirety, such information is a strong identifier of a virus' identity; a short signature extracted from it permits rapid, less exact, identification. What is important is that the selected information apply to all incidences of the virus. As such, data regions which are constant over the available samples, but have the potential to vary, present a risk. The risk can be minimized by independent techniques such as interpreting the virus' code; bytes that are executed as instructions are certainly code, bytes that are not executed may be code or data, and are less reliable.

Sections that vary across samples may simply be random "buffer" data, or other data that is of no importance to the anti-virus task (e.g., a viral generation counter). However, it may also be a copy, made by the virus, of host data modified by the virus. This is common. When attaching itself, a virus will modify header information, such as the file length, so that it describes the infected host. But for the virus to avoid revealing its presence, the original host's function still needs to be performed. This generally means that the virus must restore the header information of the original host, prior to passing control to it.

The second task, alignment in function block 45 in FIG. 2, is needed because, eventually, any task of verifying the virus' identity or repairing the host by using information secreted in the virus will require exact location information.

In FIG. 2, the output 46 of this step will be that any section of type I is resolved into finer sections. Invariant sections will be described by $$<\text{I-const,null,null,loc,loc}>, \qquad (11)$$

an extension of the section description with SecType=I-const indicating that the section's bytes are the same for all samples in the associated class. Variable sections will be described by $$<\text{I-var,null,null,loc,loc}>, \qquad (12)$$

indicating that the section's bytes differ from sample to sample. In either case, both locs should have offsets which are constant (so that the sample alignment shows no variability), and both locs should use the same marker (as the section should be of fixed length).

One original section should spawn subsections of this sort which are contained within it, which cover it (with the possible exception of a few bytes), and which do not overlap. The class associated with a subsection is inherited from the original section.

FIG. 4 shows an example of the division of a viral section into variable and invariant subsections. The second virus section is split into five sections. The first of these is invariant, while the second and fourth are variable. The third and fifth sections are essentially constant but have been ADD-encrypted. For them, the constant two is identical to sample one plus sample four, rather than to sample one itself.

We now describe means for accomplishing the two goals described above. We begin with the first task, splitting a section into contiguous subsections whose bytes are constant across samples. Variable subsections are formed by the complementary, intervening regions.

With the replacement of the term "byte" with "base pair", this problem is virtually identical to the DNA sequence assembly problem, currently a central problem in computational biology. Techniques described in the literature for solving the DNA sequence assembly problem can be applied to our problem, and vice-versa. In particular, DNA sequence assembly techniques which allow for samples having extra or missing bases (so that the relative alignment of the samples shifts, along their length) could be helpful here.

A technique we designed and implemented is virtually identical, and in fact the same core greedy common-text extraction algorithm can be used for both. In this case, determine the longest byte string from the first sample that also appears in all the other samples and can be described by the same locs for all the samples. This becomes an invariant subsection and is removed from further consideration. The process is repeated until there are no more such substrings of significant length. The remaining subsections become variable subsections.

The subsections now replace the original section's AttachInfo data, and are considered sections in their own fight. That is, a single <I,loc,loc,loc,loc> record is replaced by a collection of <I-const,loc,loc,loc,loc> and <I-var,loc, loc,loc,loc> records.

An efficient variation might be as follows. If the section's samples have common markers but different offsets, replace them with common offsets. (Choose the largest offset indicating the beginning of a section, or the smallest indicating the end, so that data is truncated rather than needing to be extended.) This yields a set of samples of the same length and alignment, which can simply be compared byte-by-byte, and broken into invariant and variable contiguous regions.

Whatever the algorithm used, to avoid ascribing significance to what might be coincidental agreements, it is wise to impose a minimum length on invariant sections.

Either of the two methods described accomplishes the goals of items 1 and 2 in this section. The first method targets goal 1 and checks that goal 2 is met. The second method presumes achievement of goal 2 for guidance, and subject to this seeks satisfaction of goal 1.

Merge Classes

Even though separate classes (e.g., EXE and COM) must be maintained to describe some virus (i.e., type-I) sections, notably those that encode host information, other sections, typically including those holding the bulk of the virus' code, can often be merged. Merging sections when possible results in a more natural and more concise virus description. While the conciseness is not much of an issue for a single virus, it is for an anti-virus product's database of thousands of viruses.

A variety of means could be used to merge sections from different classes when possible. The most obvious is to attempt merging, in turn, each I-const section for each class with each I-const section for every other class. This is an optional procedure.

When sections from different classes are merged, they may require different marker/offset locations, if only because the classes (e.g., EXE and COM) have significantly different attachment patterns. Either such cases can be excluded (so that merged sections are required to have equal location information), or the AttachInfo can be generalized to allow different locations for different classes.

A preferred implementation of the invention is targeted to a particular pre-existing virus database format. In this format each class is, in effect, allowed a single marker and overall offset, in relation to which all its section locations are defined. Within this framework, sections from different classes can be merged only if their location information is identical.

One means for accomplishing this is as follows. First, let some section that is common to as many classes as possible serve as a reference (a "string"-type marker). (The "common" sections might vary slightly in length, as long as they are eventually pruned to their longest common substring.) This section now has the same location information in the classes, by construction, and can be merged across them. Assuming that the classes do have some overall alignment, other sections may also be aligned (may have the same offsets with respect to this string marker), and may also be combined (perhaps after pruning to a longest common portion). Now, if possible, return from the string marker back to the original markers: if for each class the string marker differs from a "begin", "end", or "entry" marker by a constant (constant over all samples from the class), that constant may be introduced as an "offset correction" for that class/marker. If this can be done in all cases, the original markers can be used, in lieu of the temporarily introduced string marker. The "offset correction" would be an additional record in each entry in the FullAttachInfo; i.e., an additional entry in the vector of equation (1). If just one offset correction per class is allowed, this is a single number; otherwise, it is a number for each marker type used.

Managing Encrypted Viruses

Aligning and partitioning sections so that the derived sections have identical content for all the samples in a class is complicated by viruses which encrypt themselves. Such self-encrypting viruses have a relatively small "degarbling head" which remains in the clear. When the virus is executed, control passes first to the degarbling head, which decrypts the body of the virus and then passes control to it. The body performs the main function of the virus, presumably including attaching a newly-encrypted copy of the virus to some new host. For such a virus, even though the underlying computer code is always the same, the appearance varies with the encryption key. Thus, a section which is essentially constant varies over samples encrypted with different keys.

For a variety of naive encryption methods commonly used by computer viruses, however, there are simple "invariant functions" which map any encryption of the same data to the same value. In particular, these encryption methods all have the property that encryption with a zero key is the identity operation; i.e., the ciphertext is equal to the plaintext. Thus, the result of applying the invariant function (or simply "invariant") to any encryption of the plaintext is equal to the result of applying the invariant to the plaintext itself.

In general, encryption methods do not possess simple invariants, but many of the methods used by computer viruses do.

A number of encryption methods in more or less common use are now described, and invariant operations appropriate to each of them presented. The invariants are not 1:1 functions, and entail a loss of information. Some loss is inherent in the situation. What is undoubtedly plaintext encrypted with a certain key could, conceivably, be an unrelated, extremely odd-looking plaintext encrypted with another key. However, most of the proposed invariants sacrifice very little information (often just the same amount of information as is in the key, which is the best possible), and will always produce sufficient information to give a near-zero probability of identifying a false, coincidental pattern.

In all the following, let $T_i$ be the ith byte of the plaintext, and k be the encryption key. $S_i$, the ith byte of the encrypted text, is defined by T and k. Finally, $V_i$, the ith byte of a proposed invariant, must be defined in terms of S, and when expressed in terms of T and k, must be shown to be independent of k.

1. Add encryption: modulo 256, add the key, a 1-byte constant, to each element of the data. In the following, all operations will implicitly be performed modulo 256. An invariant is $V_i = S_i - S_{i-1}$. To verify this, note that $$V_i = S_i - S_{i-1} = (T_i + k) - (T_{i-1} + k) = T_i - T_{i-1}, \quad (13)$$

and does not depend on k.

2. Word-wide add: modulo 65536, add the key, a 1-word (2-byte) constant, to each word of the data.

Invariant: Same as for 1, except redefine everything in terms of words rather than bytes.

Alternatively, byte $V_i = S_{2i+2} - S_{2i}$, corresponding to attending only to the low-order bytes of the plaintext, the key, and the ciphertext. Since this sacrifices half the data, patterns twice as long must be used to obtain equal confidence in a match.

For either of these invariants, the word alignment must be known: it must be known which is the high order byte and which the low order byte of each word. If this is not known, both possibilities must be tried.

3. XOR encryption: take the exclusive-OR of the key, a 1-byte constant, with each element of the data, taking the remainder modulo 256. $V_i = S_i \oplus S_{i-1}$ is invariant, since $$V_i = S_i \oplus S_{i-1} = (T_i \oplus k) \oplus (T_{i-1} \oplus k) = T_i \oplus T_{i-1}. \quad (14)$$

In fact this is very similar to case 1, with the added simplicity that is its own inverse operation.

4. Word-wide XOR encryption: take the exclusive-or of the key, a 1-word constant, with each word of the data.

Invariant: On a byte-wise basis, define $V_i = S_i \oplus S_{i-2}$. To see that this works, consider the 1-word key k as composed of a high-order byte k' and low-order byte k". Depending on whether i is even or odd, either $S_i = T_i \oplus k'$ and $S_{i-2} = T_{i-2} \oplus k'$ or $S_i = T_i \oplus k''$ and $S_{i-2} = T_{i-2} \oplus k''$. Either way, the keys used for $S_i$ and $S_{i-2}$ are identical, and $S_i \oplus S_{i-2} = T_i \oplus T_{i-2}$, independent of k' and k", i.e., independent of k.

5. Running-key XOR: given 1-byte keys A and B, take the exclusive-OR of the ith byte of the data with the value of A+iB modulo 256.

Invariant: let $V_i$ be the 4 least significant bits of $S_i \oplus S_{i-16}$, i.e., $S_i \oplus S_{i-16}$ mod 16. To see that V is an invariant, first note that "modulo 16" operations can be applied anywhere: by definition these do not affect the 4 least significant bytes, which are all that affect the final result.

Then $$\begin{aligned} V_i &= [T_i \oplus (A + iB)] \oplus [T_{i-16} \oplus (A + (i-16)B)] \bmod 16 \\ &= [T_i \oplus T_{i-16} \oplus (A + iB) \bmod 16 \oplus (A + (i-16)B) \bmod 16] \bmod 16 \\ &= T_i \oplus T_{i-16}, \end{aligned} \quad (15)$$

since the last two terms cancel one another. This invariant has the disadvantage of losing 4 of each 8 bits of information.

Another invariant of possible interest is $V_i = S_i \oplus S_{i-256}$, but this is useful only on encrypted regions longer than 256 bytes.

Another related one is to take just the last bit of the difference between bytes two apart: $V_i = S_i \oplus S_{i-2}$ mod 2=Si–$S_{i-2}$ mod 2, but this sacrifices 7 of every 8 bits of information.

6. Bit rotation: for a key value k from 0 to 7, each byte of the data is "rotated" by k bits; that is, the least significant k bits become the most significant. Alternatively, the ith byte may be rotated by a number of bits which is ik modulo 8.

Invariant: For each of the 8 possible bit rotations of $S_i$, let $V_i$ be the one having the smallest value (as a base 2 number). This is clearly an invariant: regardless of k, and in fact regardless of the amount by which $T_i$ is rotated to give $S_i$, the 8 possible rotations of $S_i$ are the same as the 8 possible rotations of $T_i$, so $V_i$ depends only on $T_i$. In fact, the values of V can be precomputed for all 256 values of T, so that computing this invariant is just a matter of table-lookup in a 256-element table.

7. plaintext: For uniformity, the case where no encryption is performed can be considered as encryption with the identity operation: $S_i = T_i$. Of course, the identity operation $V_i = S_i$ is also an invariant.

If it were known that one of the encryption methods above had been used to encrypt viral sections, applying the corresponding invariant would produce constant text, whereupon the sections could be aligned. More particularly, apply the invariant to the attachment information output to the contents of each sample section produced. To avoid having to change any location information, pad the invariant out to the same length as the original data. (This padding can be just a single zero for the byte-based methods, a pair of zeros for the word-based ones, or 15 or 255 zeros for the methods that rely on comparing bytes a distance of 16 or 256 apart.) Then apply the alignment procedures to these modified sample sections.

While it is not generally known a priori what encryption method, if any, has been employed, there are few enough in common use, and they can all be tried in turn. Since at least some of the data will generally be unencrypted, "plain vanilla" alignment might be done first, and its results removed from further consideration. Of the remaining transformations, one could select just the transformation leading to the best alignment results, or several transformations could be nominated for different subsections. The latter has never been found necessary in practice, as we know of no virus that uses more than one encryption method at a time.

If desired, some invariant transformations can be omitted from the trial and error procedure above, as they are special cases of others. In particular, the byte-wide exclusive-or is a special case of word-wide exclusive-or, so the invariant for wide-wide exclusive-or is also an invariant for byte-wide exclusive-or. Moreover, all the invariants described under (5) may be used in lieu of both (4) and; (3). Naturally, the invariants that work for the most encryption methods are also the ones that sacrifice the most information, so in practice some balance must be struck.

Data Format for Encrypted Regions

When an "invariant" AttachInfo section refers to data that is not actually constant but is constant plaintext encrypted with a varying key, and is constant only after application of an invariant transform, this should be indicated. This is done in the optional EncryptionInfo field of the AttachInfo:

EncryptionInfo=<method,loc,corrector>, (16)

where and any other methods in the library. In one implementation of the invention, it flags the invariant function used to counter the named encryption method.

$$\text{method} = \begin{Bmatrix} \text{"plaintext"} \\ \text{"byte-add"} \\ \text{"word-add"} \\ \text{"byte-XOR"} \\ \text{"word-XOR"} \\ \text{"running-key"} \\ \text{"bit rotation"}, \end{Bmatrix} \qquad (17)$$

The loc describes the location, in the infected host, of a key that can be used to invert the encryption and recover plaintext. For now it is null. The corrector is a constant (a byte or word) used to compensate for possible error in the key. The use of this will be described later.

Signatures taken from application of an invariant to a correspondingly encrypted section can be utilized directly by a slightly modified virus scanner. The scanner need only apply the same invariant to the bytes being scanned, looking in the standard manner between this data stream and the table of signatures. Any scanning method used for unencrypted files, including those in which many patterns are searched in parallel, may be augmented in this manner to treat files encrypted in a manner having a simple invariant. If there are several possible invariants they will all have to be tried, with corresponding expansion of the computational effort required. This procedure is explained in greater detail and greater generality in IBM Docket YO994-087.

Generally, the plaintext is preferable to some other invariant. First, from plaintext the invariant can immediately be computed, but not vice-versa: so plaintext is at least as good. Second, plaintext may contain useful information: text strings that may indicate the virus' identity or relationship to previously seen viruses, or recognizable sections of computer code that may reveal something about its behavior. (For example, IBM AntiVirus' generic detection of boot sector viruses relies on byte sequences statistically associated with the code of boot sector viruses.)

Another case where plaintext is required is in reconstruction of corrupted host data. Here, the virus copies into a data region of its own some information from the host that will be needed. When the virus encrypts itself, it may also encrypt this data. If an anti-virus program is to restore the data, the data must first be decrypted.

In the cases of byte- or word-wide add or exclusive-or encryption, it is simple to obtain what we will call "aliased" plaintext. We illustrate with byte-wide add encryption.

For an invariant region (type I-const) of the virus, with byte values $C_a, C_{a+1}, \ldots, C_b$, the true state of affairs will be that a key $V_k$ taken from byte k, within a variable region of the virus is added to the constant bytes to produce the observed ciphertext $C_a+V_k, C_{a+1}+V_k, \ldots, C_b+V_k$ (part of an encrypted, virus-infected host). Through the discovery of an invariant function, it is known that the region is byte-wise add encrypted, but the key location k is unknown.

First, we must choose an "aliased encryption key" for each section. One possibility is to use the first byte of each observed ciphertext section: at location a, it has value $C_a+V_k$, $C_a$ plus the true key. But since an aliased key is just the true key plus a constant, sections which have the same true key (and usually there is only one true key for all sections) can also use the same aliased key. So, choose a minimal set of aliased keys that will work for all sections; typically this will be just a single aliased key $V_k+C_x$, the value found at offset x in an encrypted sample of the virus. (Just as a is the first byte of the invariant region illustrated above, x is any byte drawn from this or any other encrypted invariant virus section.)

Decrypting the virus sections by subtracting this key yields "aliased plaintext" $C_a-C_x, C_{a-1}-C_x, \ldots, C_b-C_x$; i.e., the true plaintext less the value $C_x$. At this stage it is known that aliasing has probably occurred, but the correction constant C is not known.

To summarize, the nominal description of the encryption is $$\text{EncryptionInfo}=<\text{"byte-add"},k,0>; \qquad (18)$$

the decryption key is at byte k, and the corrective value is 0 (no correction is required). An equivalent description is $$\text{EncryptionInfo}=<\text{"byte-add"},x,C_x>; \qquad (19)$$

the information can be decrypted using the value at byte x, if it is then corrected by the constant value $C_x$. At this stage of the algorithms, the correction information is unknown, and the encryption may be expressed as $$\text{EncryptionInfo}=<\text{"byte-add"},x,\text{null}>; \qquad (20)$$

the information can be decrypted using the value at byte x, yielding an alias of the true information with null (unknown) correction.

This procedure should be applied to each section of type I-const after application of the invariant-finding procedures. That is, every section of type I-const should have its key loc changed from null to an appropriate aliased key location.

Recovery of Corrupted Host Data

The separation of host and viral sections of an infected host as specified by the AttachInfo enables a nearly exact identification of a virus to be made. In addition, the AttachInfo goes most of the way towards enabling repair of programs infected with the virus, since it specifies the original locations of all sections of SecIType HI, those common to both the infected and uninfected samples.

However, computer viruses sometimes corrupt a few bytes of their hosts. In particular, they often modify some of the header information describing the sizes of various tables, an initial branch target, and so forth. Such modified regions are reflected in the existence of sections of SecType H in AttachInfo as contiguous regions of bytes that occur in the host but not in the infected host.

Fortunately, it is often the case that these bytes are not truly lost but merely hidden within data regions of the virus. This is due to the fact that, to remain unobtrusive, a virus ought to preserve the function of its host, which typically requires it to sequester all of the host bytes in some form. Thus the bytes can be recovered (and hence an infected file repaired) if a mapping can be established between the bytes in sections of type H and those in type I-var sections. The mapping must take into account the very likely possibility of encryption, and must hold for all (host, infected-host) sample pairs.

Figure 5:
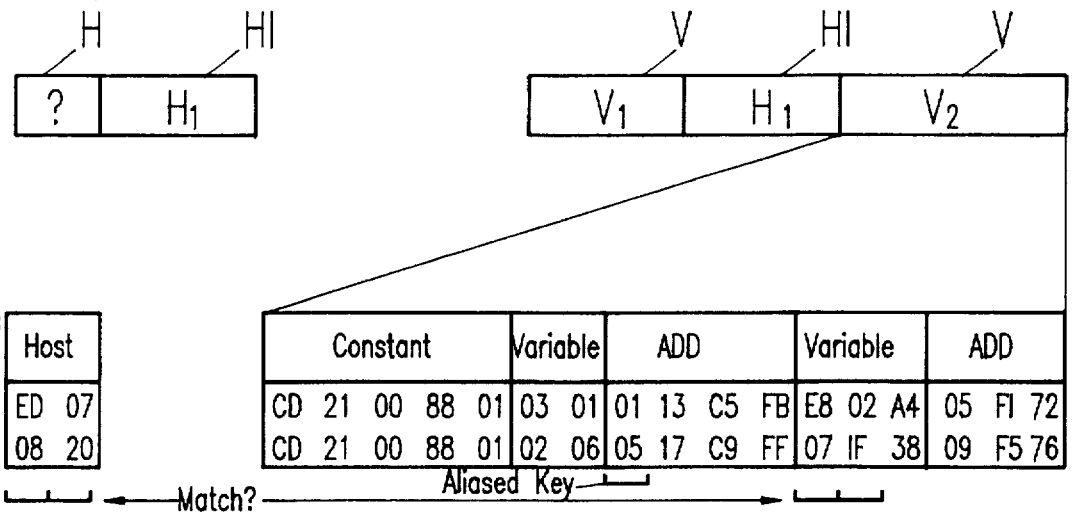
FIG. 5 is a diagram showing the process of recovery of corrupted host bytes.

This is illustrated in FIG. 5. An original host has been split into sections H and HI respectively absent from and present in the virus-infected host. At the same time, the infected host has been split into two V (virus) sections, and the same HI section. Matching FIG. 4, the second V section has been split into subsections. (In reality this would be done for all sections; the focus on a single section is merely to simplify the example.) The H host data is then matched to variable subsections of that V section. After decryption with a single aliased key, the host data matches the virus data plus 6. The 6 is used to modify the key data and locate the true key.

When such a mapping exists, it associates bytes in a section of host data (type H) with bytes in a section of virus data (type I). That means that these bytes are present in both host and virus, and can be stripped out to form a section of type HI. If encryption is involved, it can be indicated in the section's optional EncryptionInfo field.

Deriving the recovery information can be accomplished in two phases:

1. For each changed host section/offset, list all possible matching virus sections/offsets, and the corresponding EncryptionInfo
2. From the set above, intelligently choose a single match for each matchable host section/offset.

A host-virus match will ultimately be described as an HI-type section; in the process of identifying these matches all sections will be just single bytes, but we can still use the general template. The tentative matches generated in this stage of the invention will have the form $$\text{TentativeMatch} = <\text{HI,loc,loc,loc,loc,EncryptionInfo}>, \quad (21)$$

where the two host locations are equal and the two virus locations are equal.

In essence, we find all possible host-virus matches by substituting every possible combination of locations from H-type sections (host data not yet identified in the infected file), locations from I-var-type sections (virus data that is varying, and therefore may describe the host), and EncryptionInfo used in any I-const-type section (encryptions known to be used by the virus). Any combination that works, where the bytes for the host samples do indeed match those from the decrypted virus samples (up to "aliasing error" from the decryption, whose key-corrector is still null at this point), is noted as a potential match, Constraining EncryptionInfo to be drawn from its values used in I-const sections makes the problem computationally tractable. It works in practice because the copied host bytes are encrypted along with the virus; they are not treated specially by the virus.

Consider an example. Suppose the only EncryptionInfo other than plaintext is <ADD,<"entry",7>,null>; that is, decrypt by subtracting the byte at offset 7 from the entry point and connecting by ADDing with an as-yet unknown value. This corresponds to the example of FIG. 5, if we suppose that the "column" of bytes 01, 05 within the ADD subsection of $V_2$ has location <"entry", 7>. Then if it is present at all, either the host data must equal the virus data (the plaintext case), or the host data must equal the virus data minus its 7th byte plus a constant. With ≡ indicating that equality must hold for all samples, if host≡virus-byte 7+constant, then host-(virus-byte 7)≡constant, which is easily checked.

To find such matches, first apply all possible decryptions (neglecting the correctors) to the virus data, so in this example there is a plain copy and a copy from which byte 7 has been subtracted. Then check for matches between each offset of the host data and each offset of each copy of the virus data.

Optionally, the second pan of this, checking each host offset against each virus offset, can be made more efficient. At this stage, the virus bytes are presumed to be decrypted up to the aliasing constant, so the set of host bytes $<h_1,h_2,h_3,\ldots>$ is equal to the set of virus bytes $<v_1,v_2,v_3,\ldots>$ up to this aliasing. That means they have the same invariant. For example, if we are considering ADD-encryption, $<h_2-h_1,h_3-h_2,\ldots>$ is exactly equal to $<v_2-v_1,v_3v_2,\ldots>$. Thus, the results of applying the invariant transform to the host and virus bytes, at given offsets, can be compared for exact equality. This can be done without explicit comparison of every host offset with every virus offset, which is where the increased efficiency is achieved. Instead, transformed bytes can be lexicographically sorted, and equal sets of values will sort together. If there are m host offsets and n virus offsets the sorting method takes time O((m+n)log(m+n)), which is less than the time O(mn) required by the first algorithm.

Whenever a matching between host and virus data is made, it implies a corrector value for the EncryptionInfo involved: that which makes the host data exactly equal to the decrypted virus data.

If there is no match for a changed host byte, it cannot be recovered. If there is a unique match, it can be recovered by decrypting matching virus byte. If there are several matches, further means must be employed to determine the correct one.

To choose a reliable match for each matchable host byte, we use the fact that viruses tend to copy blocks of host bytes together. This means that if a host byte in location $loc_h$ is copied to a virus byte in location $loc_v$ and encrypted via EncryptionInfo, then the host byte at location $loc_h+1$ (i.e., with the same marker and offset greater by 1) is, if copied at all, most likely copied to the virus byte at location $loc_v+1$ with the same EncryptionInfo. So if we summarize each host-virus byte matching by the two marker types, the encryption information, and the offset difference, but not either of the offsets themselves, $$\text{MatchSummary} = <\text{marker}_h,\text{marker}_v,\text{offset}_h-\text{offset}_v,\text{EncryptionInf}> \quad (22)$$

it is likely that the same MatchSummary will apply to many different host bytes.

We seek the minimum set of MatchSummary values that allows each host byte to be matched according to one of them. (If several matches are still possible, which has rarely been the case in practice, ties can be broken arbitrarily, or human expertise can be sought.)

The problem of finding this set of MatchSummary values can be cast as one of the standard NP-complete problems in computer science. See, for example, M. R. Garey and D. S. Johnson, *Computers and Intractability*, Freeman, San Francisco, Calif. (1979).

Minimum cover: Given a collection C of subsets of a finite set S, find a minimum-size "cover": a subset C⊂C such that every element of S belongs to at least one member of C.

Here, the finite set S is the set of proposed host-virus byte matches, the collection C is the collection of MatchSummaries, and the collection C sought is the minimum-size set of MatchSummaries providing an explanation for every host byte. We seek the minimum set in accordance with the Occam's razor principle that the most compact explanation for a phenomenon is the most likely.

The literature contains various algorithms for solving the minimum cover problem. For our purposes, the obvious greedy algorithm has always delivered an optimal solution. It is to first choose a MatchSummary that "covers" as many matches as possible, then choose another that covers as many as possible of those missed by the first, etc. If after this there are several MatchSummaries applicable to a single host byte, choose one by any means. Then there is a unique MatchSummary for each matchable host byte, and the matches can be expressed in the form of an HI-type section.

It is also possible to generalize slightly, to seek a minimum-cost cover. That way, use of several different key-corrections can be heavily penalized (as there is almost certainly just one value in reality), while different index-offsets between matching host and virus bytes can be charged more lightly (since variations here are quite common). In either case, use of a minimum cover or minimum-cost cover will tend to minimize "false", coincidental matches: match-records yielding a whole pattern of matches will be preferred over, and to the exclusion of, single matches arising by chance.

The "aliased key" that may be produced by the decryption step and the key-correction produced by the derive-match step can be combined to find the true decryption key. The decryption step produces a match/index location for a key, from which, for each sample, the key's value may be ascertained. To these values, the key-correction value is subtracted (or XORed or whatever the decryption operation), to produce the true-key values for all samples. Sweeping through the infected host-viral fraction data section by section and index by index, we seek an index whose byte values match the true-key values. Any such index may serve as a true-key index. At this point, the true-key index is adopted in lieu of the aliased-key index, and the key-correction values and procedures are disregarded.

A continuation of the example given above can serve as an illustration. There we postulated that host=virus-byte 7+constant. For a successful match, inverting the equation to const=host-(virus-byte 7) instantiates the constant: in the example of FIG. 5 the constant works out to be the byte value 06. Then the aliased key is the byte 7th byte, the corrector is 06, and the true key for a given sample is its 7th byte minus 06. That true key value may itself occur at several places within the sample. If one of those places is consistent across all the samples, we adopt it as the true key location. For instance, if the true key for sample 1 occurs at its offsets 10,41, and 231, and that for sample 2 occurs at its offsets 10 and 142, and all the other samples concur in the offset 10, we amend the EncryptionInfo from <ADD,byte 7,06> to <ADD,byte 10,0>. In FIG. 5, the true key values are FB=01–06, and FF=05–06. Where the aliased keys, 01 and 05, occurred at offset 7, the true keys FB and FF are found at offset 10. (In the figure, other occurrences of FB in the first sample, and FF in the second, are not shown.)

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for automatically deriving verification and removal information for a function-preserving transformation of computer data from a set of untransformed data samples and corresponding transformed data samples, comprising the steps of:

obtaining a set of "sample pairs", each sample pair consisting of a transformed data sample and a corresponding original, untransformed data sample;

locating one or more fragments of each original data sample within a corresponding transformed data sample to obtain a generalized description, applicable to each of the sample pairs, of locations of fragments of each original data sample and locations of new data regions added by the function-preserving transformation that applies to each of the sample pairs;

matching new data regions added by the function-preserving transformation across different samples to obtain a description of portions of the new data regions that are "invariant" across different samples;

locating within other, variable portions of the new data regions any data from an original data sample embedded there;

generating a prescription for verifying with high confidence that any given data sample has resulted from an application of the function-preserving transformation; and generating a prescription for restoring a data sample that has been transformed by the function-preserving transformation to a form functionally equivalent to that prior to the transformation.

2. The method recited in claim 1 wherein the function-preserving tranformation is a computer virus.

3. The method recited in claim 1 wherein the step of locating one or more fragments of each original data sample includes the step of using markers to identify relative locations in each original data sample.

4. The method recited in claim 1 wherein data from the original data sample is embedded in said variable portions of new data regions by encryption, said method further comprising the step of deriving an encryption key for decrypting embedded original data.

5. A method for automatically deriving verification and removal information for a computer virus from a set of infected programs and corresponding uninfected programs, comprising the steps of:

obtaining a set of "sample pairs", each sample pair consisting of a program infected with the computer virus and a corresponding original, uninfected program;

generating a description of how the computer virus attaches to host programs;

matching viral data across different infected samples to obtain a description of "invariant" portions of the computer virus;

locating within other, variable portions of the computer virus any host bytes embedded there;

generating a prescription for verifying with high confidence that any given program is infected with the computer virus; and generating a prescription for restoring a program that has been determined to have been infected with the computer virus to a state functionally equivalent to the program's original, uninfected state.

6. The method recited in claim 5 wherein the step of obtaining a set of "sample pairs" includes the step of selecting "goat" files of uninfected programs and causing the "goat" files to be infected by a computer virus.

7. The method recited in claim 5 wherein said computer virus applies an encryption to some or all code and data of the computer virus and a host program, further including the step of identifying a method of decryption inverse to the encryption, identifying a location of a key suitable for said decryption, and identifying a plaintext of said computer virus.

8. The method recited in claim 7 wherein the key location is an encryption of a true key with another, fixed key and the plaintext is a decryption of a computer virus' true plaintext with the fixed key, wherein the step of identifying a location of a key and identifying a plaintext includes identifying a location of a true key and true plaintext.

9. The method recited in claim 5 wherein the step of generating a description of how the virus attaches to a host program includes an attachment description:

$$\text{FullAttachInfo} = \{<\text{class,AttachInfo}>_c\},$$

where the notation indicates a set of <class,AttachInfo> vectors, each indexed by a value of c, the classes being defined by attributes of the infected host program.

10. The method recited in claim 9 wherein class definitions are $$\text{class} = \begin{cases} \text{``COM''} \\ \text{``EXE''} \\ <\text{``length''}, \text{min-length}, \text{max-length}> \end{cases}.$$

and for any class, the attachment is described in the form

AttachInfo={<SecType,loc,loc,loc,loc[,EncryptionInfo>]$_i$} which is a collection of sections, indexed by i, and described by a "type" and four locations.

11. The method recited in claim 10 wherein the sections are a partition of original and infected hosts into contiguous regions and there are three types of sections, described by $$\text{SecType} = \begin{cases} H: & \text{section appears in original host only;} \\ I: & \text{section appears in infected host only;} \\ HI: & \text{section appears in original and} \\ & \text{infected hosts.} \end{cases} \quad (4)$$

and wherein sections of type H and HI cover an entire original host without any overlap, and sections of type I and HI cover an entire infected host without any overlap.

12. The method recited in claim 5 wherein the step of generating a description of how the computer virus attaches to the host program includes the step of using markers to identify relative locations in the data and a marker takes one of the values $$\text{marker} = \begin{cases} \text{``begin''} \\ \text{``end''} \\ \text{``entry''} \\ <\text{``string''}, \text{character string}, \end{cases}$$

where in the last case, said description includes the character string serving as the marker.

13. A computing system for automatically deriving verification and removal information for a function-preserving transformation of computer data from a set of untransformed data samples and corresponding transformed data samples, comprising:

data accessing means for obtaining a set of "sample pairs", each sample pair consisting of a transformed data sample and a corresponding original, untransformed data sample;

scanning means operable on the set of "sample pairs" obtained by said data accessing means for locating one or more fragments of each original data sample within a corresponding transformed data sample to obtain a generalized description, applicable to each of the sample pairs, of the locations of the original fragments and locations of new data regions added by the function-preserving transformation that applies to each of the sample pairs;

comparing means operable on the set of "sample pairs" obtained by said data accessing means for matching new data regions added by the function-preserving transformation across different samples to obtain a description of portions of the new data regions that are "invariant" across different samples;

said scanning means locating within other, variable portions of the new data regions any data from an original data sample embedded there; and output means responsive to said scanning means and said comparing means for generating a prescription for restoring a data sample that has been transformed by the function-preserving transformation to a form functionally equivalent to that prior to the transformation.

14. The computing system recited in claim 13 further comprising means for verifying with high confidence that any given data sample has resulted from an application of the function-preserving transformation prior to said output means generating a prescription for restoring a data sample.

15. The apparatus recited in claim 13 wherein the function-preserving transformation is a computer virus.

16. A computer implemented-method for automatically deriving a general description of an effect of a transformation of original data on any given sample of the data, comprising the steps of:

obtaining a plurality of input data samples consisting of
  (a) one or more samples of transformed data resulting from application of the transformation to the original data, and
  (b) zero or more sample pairs, each sample pair consisting of
    i. an original data sample, and
    ii. a transformed data sample resulting from application of the transformation to a same original data sample;

comparing the input data samples with one another to obtain a universal transformation description which describes a relationship between original and transformed data, said universal transformation description being consistent with the input data samples;

outputting the universal transformation description as a universal transformation which is applicable to samples of data included or not included among the input data samples; and in cases where the transformation is reversible or partly reversible, deriving a general description of a means of reversing or partly reversing an effect of the transformation.

17. The computer-implemented method recited in claim 16 wherein the transformation of data is performed by a computer virus.

18. The computer-implemented method recited in claim 16 wherein the step of obtaining samples includes converting an original "goat" data sample to a sample pair by causing the transformation to be applied to the "goat" data sample.

19. The computer-implemented method recited in claim 18 wherein the original "goat" data sample is designed to possess variation in one or more attributes including a size of the "goat" data sample in bytes, a type of data, and a presence or absence of regions of repeated bytes and lengths of the regions.

20. The computer-implemented method recited in claim 16 wherein the step of obtaining input data samples includes converting a transformed data sample to a sample pair by obtaining a corresponding original data sample.

21. The computer-implemented method recited in claim 16 wherein the step of comparing the data samples with one another to obtain a universal transformation description begins with a set of structural templates that, based on prior knowledge of the transformation, are likely to be applicable and comprises the steps of:

selecting a template and determining its parameters in such a way that a mapping between the original and transformed members of each sample pair is completely and accurately described;

reporting an identity of the template and the parameters of a template match in the case of a successful match; and reporting failure if no templates produce a suitable explanation for the transformation.

22. The computer-implemented method recited in claim 16 wherein the step of comparing the data samples with one another to obtain a universal transformation description includes the steps of:

comparing transformed and untransformed data samples of each sample pair;

locating within the transformed data sample in each sample pair one or more contiguous byte regions, each region being equivalent to a corresponding byte region in a corresponding original untransformed data sample;

outputting a transformation description applicable to each of the sample pairs containing locations within transformed and untransformed data samples of equivalent contiguous byte regions, locations of zero or more new data regions within a transformed data sample that do not occur within an untransformed data sample, and locations of zero or more missing data regions within an untransformed data sample that do not occur within a transformed data sample, each transformed data sample being fully or partially covered by a series of equivalent data regions and new data regions, and each untransformed data sample being fully or partially covered by a series of equivalent data regions and missing data regions;

matching new data regions added by the transformation across different transformed samples to obtain a description of portions of new data regions that are invariant across different samples; and locating within other, potentially variable portions of new data regions any data from missing data regions that are embedded there.

23. The computer-implemented method recited in claim 16 wherein the step of comparing the data samples with one another to obtain a universal transformation description comprises the steps of:

comparing transformed data samples with one another to identify one or more new data regions consisting of equivalent contiguous byte sequences that are present in all of the transformed data samples; and eliminating from new data regions any regions or portions of regions that appear in all of the untransformed data samples; and wherein the step of outputting the universal transformation description includes outputting a description of locations of the new data regions.

* * * * *